US011418782B2

(12) United States Patent
Lamkin et al.

(10) Patent No.: US 11,418,782 B2
(45) Date of Patent: Aug. 16, 2022

(54) MULTI-RESOLUTION REGIONALIZED DATA TRANSMISSION

(71) Applicant: Lockheed Martin Corporation, Bethesda, MD (US)

(72) Inventors: Mark A. Lamkin, Fort Worth, TX (US); Kyle Martin Ringgenberg, Fort Worth, TX (US); Jordan David Lamkin, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/993,511

(22) Filed: Aug. 14, 2020

(65) Prior Publication Data

US 2020/0374521 A1 Nov. 26, 2020

Related U.S. Application Data

(62) Division of application No. 15/988,599, filed on May 24, 2018, now Pat. No. 10,764,581.

(51) Int. Cl.
*G06K 9/36* (2006.01)
*H04N 19/119* (2014.01)
(Continued)

(52) U.S. Cl.
CPC ............ *H04N 19/119* (2014.11); *G06F 3/14* (2013.01); *H04N 19/115* (2014.11); *H04N 19/59* (2014.11)

(58) Field of Classification Search
None
See application file for complete search history.

(56) References Cited

U.S. PATENT DOCUMENTS 6,252,989 B1 * 6/2001 Geisler ............... H04N 19/176
345/555
9,380,273 B1  6/2016 Jensen et al.
(Continued)

OTHER PUBLICATIONS

Kortum, P.T. and Geisler, W.S. (1996) Implementation of a foveated image-coding system for bandwidth reduction of video images. In B. Rogowitz and J. Allebach (Eds.) Human Vision and Electronic Imaging. SPIE Proceedings, 2657, 350-360. (Year: 1996).*
(Continued)

*Primary Examiner* — Randolph I Chu
(74) *Attorney, Agent, or Firm* — Baker Botts L.L.P.

(57) ABSTRACT

According to certain embodiments, reducing data signal bandwidth comprises receiving a multi-resolution image having a plurality of concentric regions that each have a different level of resolution, where the regions closer to the center having greater levels of resolution. Generating a representative image comprising first rasterizing the multi-resolution image into a pixel representation of pixel data with an array of pixel values. A ring of pixels for each region results from discarding duplicate pixels from each region such that only the interior pixels from each region are preserved. In a first circular direction, duplicate pixels along each ring are discarded, the preserved unique pixels resulting in ring fragments. The ring fragments are then moved towards the center so that there are no gaps between the ring fragments for each level of resolution. After resizing the array, discarded pixels are replaced with the pixel value from pixels in the second circular orientation with respect to their level of resolution.

16 Claims, 11 Drawing Sheets

(51) Int. Cl.
  *G06F 3/14*   (2006.01)
  *H04N 19/115*  (2014.01)
  *H04N 19/59*   (2014.01)

(56) References Cited

U.S. PATENT DOCUMENTS

| | | | |
|---|---|---|---|
| 9,456,134 | B2 | 9/2016 | Venkataraman et al. |
| 9,703,374 | B1 | 7/2017 | Zhang |
| 9,710,887 | B1 | 7/2017 | Sahlsten |
| 2014/0247277 | A1* | 9/2014 | Guenter ............. G06T 11/40 345/611 |
| 2015/0078676 | A1* | 3/2015 | Arai ................. G06T 5/10 382/260 |
| 2015/0287158 | A1 | 10/2015 | Cerny et al. |
| 2015/0287240 | A1 | 10/2015 | Janczak et al. |
| 2015/0312560 | A1* | 10/2015 | Deering ............. A61F 2/1602 345/1.3 |
| 2016/0284119 | A1 | 9/2016 | Surti et al. |
| 2016/0343164 | A1 | 11/2016 | Urbach et al. |
| 2017/0109562 | A1 | 4/2017 | Shroff et al. |
| 2017/0123492 | A1 | 5/2017 | Marggraff et al. |
| 2017/0124760 | A1 | 5/2017 | Murakawa et al. |
| 2017/0169602 | A1 | 6/2017 | Blackmon et al. |
| 2017/0200308 | A1 | 7/2017 | Nguyen et al. |
| 2018/0059780 | A1* | 3/2018 | Mitchell ............. A63F 13/52 |
| 2018/0061084 | A1* | 3/2018 | Mitchell ............. A63F 13/21 |
| 2018/0061116 | A1* | 3/2018 | Mitchell ............. G06F 3/012 |
| 2018/0137598 | A1* | 5/2018 | Spitzer ............... G06F 3/013 |
| 2018/0137602 | A1* | 5/2018 | Spitzer ............... G06F 3/013 |
| 2018/0220119 | A1* | 8/2018 | Horvitz ............. H04N 13/344 |
| 2019/0364277 | A1 | 11/2019 | Lamkin et al. |

OTHER PUBLICATIONS

Geisler, W.S. and Perry, J.S. (1998) A real-time foveated multi-resolution system for low-bandwidth video communication In: B. Rogowitz and T. Pappas (Eds.), Human Vision and Electronic Imaging, SPIE Proceedings 3299,294-305. (Year: 1998).*

Wu et al. Digital Video Image Quality and Perceptual Coding, Chapter 14 (Year: 2005).*

* cited by examiner

MULTI-RESOLUTION REGIONALIZED DATA TRANSMISSION

RELATED APPLICATION

This application is a divisional application of U.S. application Ser. No. 15/988,599 filed May 24, 2018 and entitled "Multi-Resolution Regionalized Data Transmission."

TECHNICAL FIELD

The invention relates generally to a system for reducing the bandwidth of multi-resolution regionalized image transmissions and using reduced-bandwidth imagery.

BACKGROUND

Multi-resolution images with varying regions of resolutions provide for a reduction in the complexity of an image's detail. Foveated imaging is a type of multi-resolution image where the regions of resolution correspond to the level of detail that is distinguishable by the human eye, therefore reducing the amount of superfluous detail in peripheral regions of the foveated image. Conventional mechanisms for multi-resolution images may reduce GPU workload, but do not take advantage of the reduced complexity of these multi-resolution images, requiring bandwidth equivalent to transmission of a continuous-resolution image.

SUMMARY OF THE DISCLOSURE

According to certain embodiments, a non-transitory computer readable medium comprises logic that, when executed by a processor, causes the processor to perform operations for reducing data signal bandwidth. The logic comprises receiving a multi-resolution image and generating a representative image therefrom. The received multi-resolution image has a plurality of concentric regions that each have a different level of resolution, where the regions closer to the center having greater levels of resolution.

Generating the representative image comprises first rasterizing the multi-resolution image into a pixel representation of pixel data with an array of pixel values. Next, a ring of pixels for each region results from discarding duplicate pixels from each region such that only the interior pixels from each region are preserved. Next, in a first circular orientation, duplicate pixels along each ring are discarded, the preserved unique pixels resulting in ring fragments. The ring fragments are then moved towards the center so that there are no gaps between the ring fragments for each level of resolution. After resizing the array, discarded pixels are replaced with the pixel value from pixels in the second circular orientation with respect to their level of resolution.

According to certain embodiments, a non-transitory computer readable medium comprising logic that, when executed by a processor, causes the processor to perform operations for reconstituting a multi-resolution image from a representative image. The logic comprises receiving a representative image and generating a reconstituted multi-resolution image therefrom. The received representative image comprises an array of pixels and has a plurality of concentric regions, each concentric region corresponding to a different level or resolution from a source image, wherein the concentric regions closer to a center of the multi-resolution correspond to regions with the higher resolution. Generating a reconstituted multi-resolution image comprises determining a length, width, and scale factor for a resized array based on a length and a width of the array of pixels of the received representative image. Resizing the array of pixels based at least in part on the determined length and width then repositioning pixel fragments from each region away from the center based at least in part on the scale factor. Replacing missing pixels with a pixel value selected from a pixel in a nearest first circular orientation of the respective level or resolution defining a plurality of rings, replacing exterior pixels from each concentric region with a pixel value selected from a pixel value in an interior position from the ring corresponding to the region, and replacing corner pixels in each region from a pixel in a nearest second circular orientation.

According to certain embodiments, a computerized method for reducing data signal bandwidth comprises receiving, at a processor, a multi-resolution image and generating a representative image therefrom. The received multi-resolution image has a plurality of concentric regions that each have a different level of resolution, where the regions closest to the center having greater levels of resolution. Generating, at a processor, the representative image comprises first rasterizing the multi-resolution image into a pixel representation of pixel data with an array of pixel values. Next, a ring of pixels for each region results from discarding duplicate pixels from each region such that only the interior pixels from each region are preserved. Next, in a first circular direction, duplicate pixels along each ring are discarded, the preserved unique pixels resulting in ring fragments. The ring fragments are then moved towards the center so that there are no gaps between the ring fragments for each level of resolution. After resizing the array, discarded pixels are replaced with the pixel value from pixels in the second circular orientation with respect to their level of resolution.

Certain embodiments may provide one or more technical advantages. As an example, certain embodiments provide advantages for reducing the bandwidth of the transmission of a multi-resolution image. As a result of the reduced bandwidth requirements of transmission systems the technical requirements of facilitating such a system may reduce the cost of certain components. In other transmission systems, the reduced bandwidth may enable greater transfer rates, with respect to transmission of image and video data this may lead to higher transmitted framerate. For certain display systems, the reduced bandwidth may provide the advantage of sending higher perceived resolution data than would otherwise be possible over a given channel. As another example, certain embodiments may reduce the number of units required for publication of a multi-resolution image. Certain embodiments may include all, some, or none of the above-described advantages. Other advantages will be apparent to those of ordinary skill in the art.

BRIEF DESCRIPTION OF THE DRAWINGS

For a more complete understanding of the present disclosure, reference is now made to the following description, taken in conjunction with the accompanying drawings, in which:

FIGS. 2A-2F illustrates an example series of image transformations for the reduced-bandwidth transmission of a multi-resolution image such as the image of FIG. 1;

FIG. 4A-4G illustrates an example series of image transformations for the reconstitution of the multi-resolution image from a representative image;

DETAILED DESCRIPTION

Multi-resolution imaging is an effective means by which one may selectively reduce the complexities of an image and associated video stream. One type of multi-resolution image—a foveated image—is an image in which the image resolution or amount of detail, varies across the image according to a single fixation point. A fixation point indicates the highest resolution region of the image and corresponds to the center of the eye's retina, the fovea. Certain foveated images may have the fixation point about the center of the image. Foveation may be used to reduce the load of a graphics rendering system such as a graphics processing unit. However, the benefits to graphics rendering from conventional systems may not lead to any added benefits in the transmission bandwidth of such foveated images when propagated to a display system.

Certain embodiments, disclose a system for the publication of foveated imagery at a reduced number of units. These reduced number of units may be associated with the varying levels of resolutions within a foveated image such that the transmission of foveated imagery may also realize the benefits from the simplified image complexity. Thus, the transmission aspect of multi-image systems may appreciate gains similar to those experienced by the graphics rendering system. While the disclosed embodiment may have particular advantages with foveated imagery, it may be appreciated that advantages may be achieved in the transmission of any multi-resolution image.

Embodiments of the present disclosure and its advantages are best understood by referring to FIGS. 1 through 6 of the drawings, like numerals being used for like and corresponding parts of the various drawings.

Figure 1:
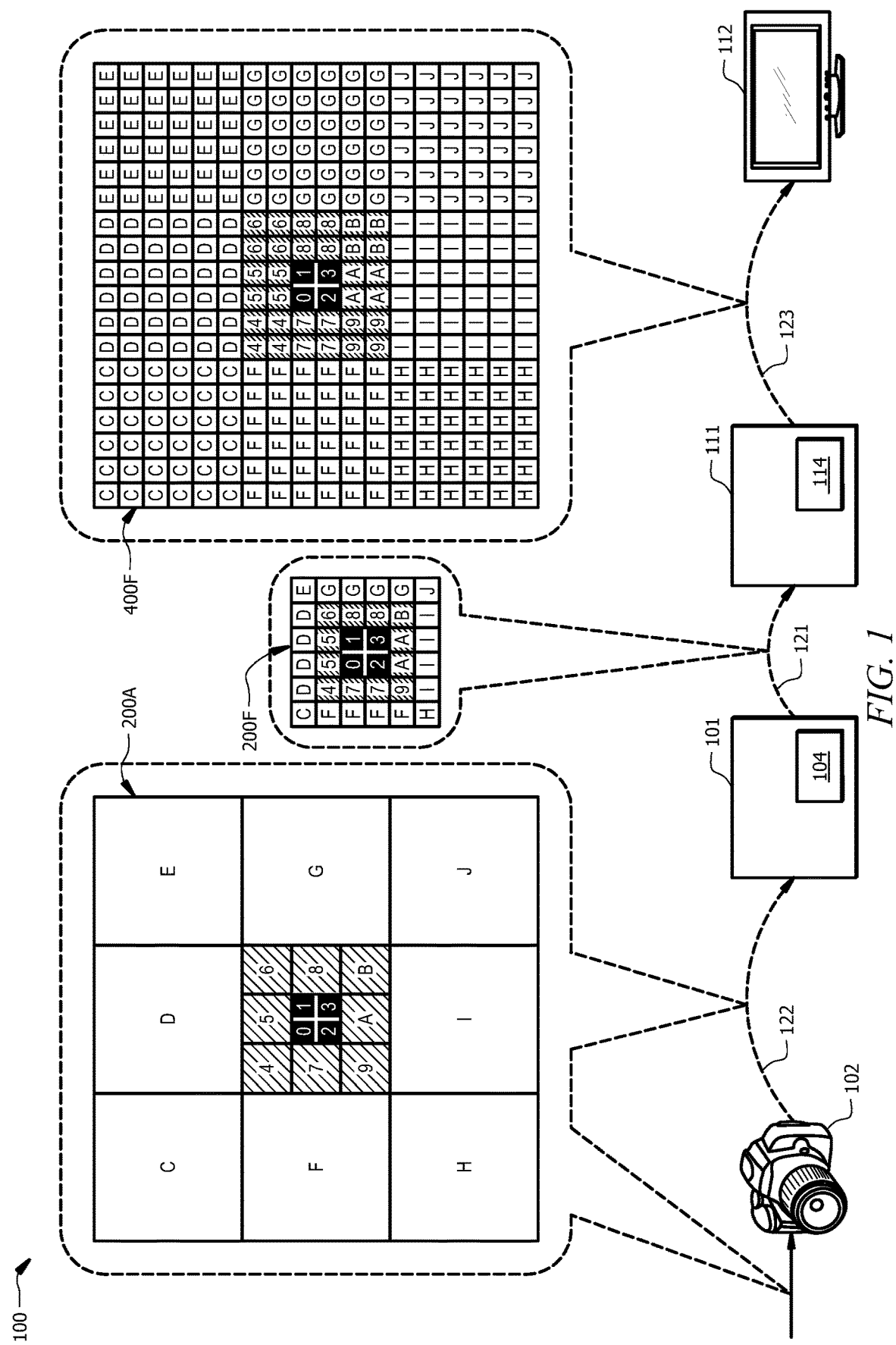
FIG. 1 illustrates an example embodiment of a system for transmitting reduced-bandwidth representations of a multi-resolution image.

FIG. 1 illustrates a system block diagram for a particular embodiment of a system 100 for transmitting reduced-bandwidth representations of a multi-resolution image. System 100 may include a first and a second computer 101 and 111, a source 102, and a destination 112. Various components of system 100 may be communicatively coupled via communication links 121-123. System 100 may have a first computer 101 and a second computer 111 in communication via communication link 121. Computer 101 may have a processor coupled to a computer readable medium 104 and computer 111 may have a processor coupled to a computer readable medium 114. The processor coupled to the computer readable medium 104 and 114 may be capable of performing operations contained in the computer readable medium. Computers 101 and 111 will be described in further detail with respect to the description of FIG. 6. Source 102, computer 101, computer 111, and destination 112 cooperate to perform the reduced-bandwidth transmission of a multi-resolution image. A multi-resolution image 200A may be received at the source 102 such as by capture of the image 200 by a camera. Source 102 may then provide the multi-resolution image 200A to computer 101 through communication link 122. With the received multi-resolution image 200A, the processor and computer readable medium 104 of computer 101 may perform a series of image transformation operations to produce a representative image 200F that may be more suitable to be transmitted with less bandwidth. Computer 101 may then transmit representative image 200F to computer 111 through communication link 121. With the received representative image 200F, the processor and computer readable medium 114 of computer 111 may then perform another series of image transformation operations to reconstitute the multi-resolution image 400F from the representative image 200F. Computer 111 may then provide the reconstituted multi-resolution image 400F to a destination 112 through communication link 123. Destination 112 may then display the reconstituted multi-resolution image 400F.

Communication link 121 may be a wired or wireless communication link. Communication link 121 may be facilitated using a display communication protocol (e.g., High-Definition Multimedia Interface ("HDMI"), DisplayPort, etc.), but any suitable communication protocol may be used. Communication link 121 may facilitate the communication of image data, audio data, or video data. Furthermore, transmission via communication link 121 may be continuous or intermittent. Likewise, communication links 122 and 123 may be implemented using the above disclosed implementation as recited with respect to communication link 121.

Computer 101 may be in communication with a source 102 via communication link 122. As illustrated in FIG. 1, source 102 is represented as a camera. Source 102 may be a graphics processing unit ("GPU"), a still frame camera, or a video camera. Source 102 may be a digital video camera, but analog cameras are also contemplated within the scope of the disclosure. In some embodiments, source 102 may be a device other than a camera. For example, source 102 may be any device capable of providing an image or video to computer 101 (e.g., removeable storage device such as an optical disc, a memory card, a Universal Serial Bus ("USB") flash drive, or external hard disk.)

Computer 111 may be in communication with destination 102 via communication link 123. As illustrated in FIG. 1, destination 102 is represented as a display such as a head-mounted display. Destination 102 may be a television or computer monitor. In general, destination 102 may be any device capable of receiving or storing an image or video from computer 111 (e.g., Video Home System ("VHS") tape, removeable storage device such as an optical disc, a memory card, a Universal Serial Bus ("USB") flash drive, or external hard disk.)

With regard to FIG. 1, system 100 may receive a multi-resolution image 200A. Images 200A, 200F, and 400E will be described in greater detail in with respect to the description in FIGS. 2-5 below. Image 200A may be received by source 102 and communicated via communication link 122 to computer 101 or may be received directly by computer 101. After receiving image 200A, computer 101 may perform a series of operations using image 200A to produce a representative image 200F. These operations will be described in greater detail with respect to FIGS. 2-3 below. computer 101 may communicate representative image 200F to computer 111 via communication link 121. System 100 may provide advantages for reducing the bandwidth of the transmission of a multi-resolution image. As a result, the technical requirements for facilitating transmissions may be reduced, leading to a reduction in the cost of certain components. The reduced bandwidth may also enable greater transfer rates of image and video data this may lead to higher transmitted framerate. For certain display systems, the reduced bandwidth may provide the advantage of enabling the transmission of multiple viewing angles simultaneously to allow a particular viewing angle to be selected by the display. As another example, certain embodiments may reduce the number of units required for publication of a multi-resolution image.

Upon receiving representative image 200F from the first computer 101 via communication link 121, the second computer 111 may perform a series of operations using representative image 200F to produce a reconstituted image 400E. computer 111 may then transmit reconstituted image 400 for display on destination 112 with lossless reproduction of the multi-resolution image. These operations will be described in greater detail with respect to FIGS. 4-5 below. Where a single computer performs the functions of both 101 and 111, the single computer 101 may communicate representative image 200F or image 400E to destination 102 via communication link 123. For example, a single computer 101 embodiment of system 100 may be beneficial in applications where multiple multi-resolution images are simultaneously compressed to be saved in storage 606 or where multiple source 102 perspectives are simultaneously made available for near-instantaneous selection by the viewer of destination 112.

In particular embodiments, various components of system 100 may be redundant or unnecessary. For example, a single computer may perform the functions of both the first computer 101 and the second computer 111. In other examples, source 102 may be an internal device of computer 101. System 100 may perform only the operations of generation a representative image 200F from the multi resolution image 200A and transmitting the representative image 200F. In other embodiments, system 100 may perform only the operation of generating reconstituted image 400E from a received representative image 200F.

Figure 5:
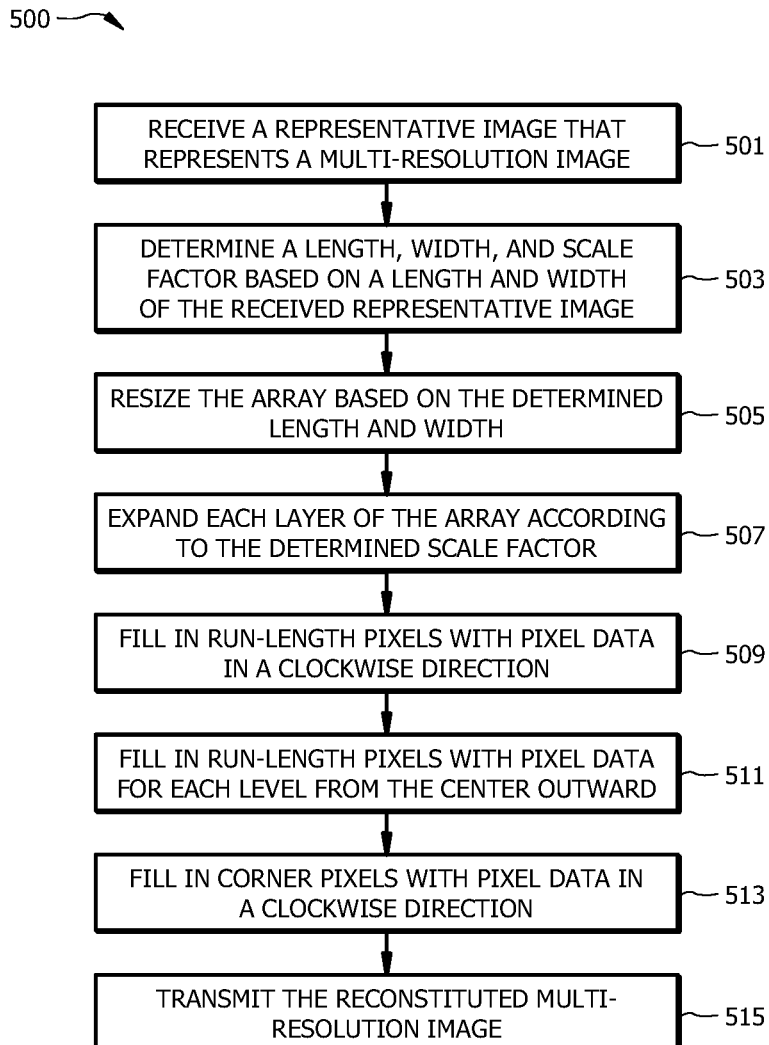
FIG. 5 is a flow chart illustrating a method of reconstituting a multi-resolution image from a representative image associated with the example series of image transformations of FIGS. 4A-4G.
Figure 6:
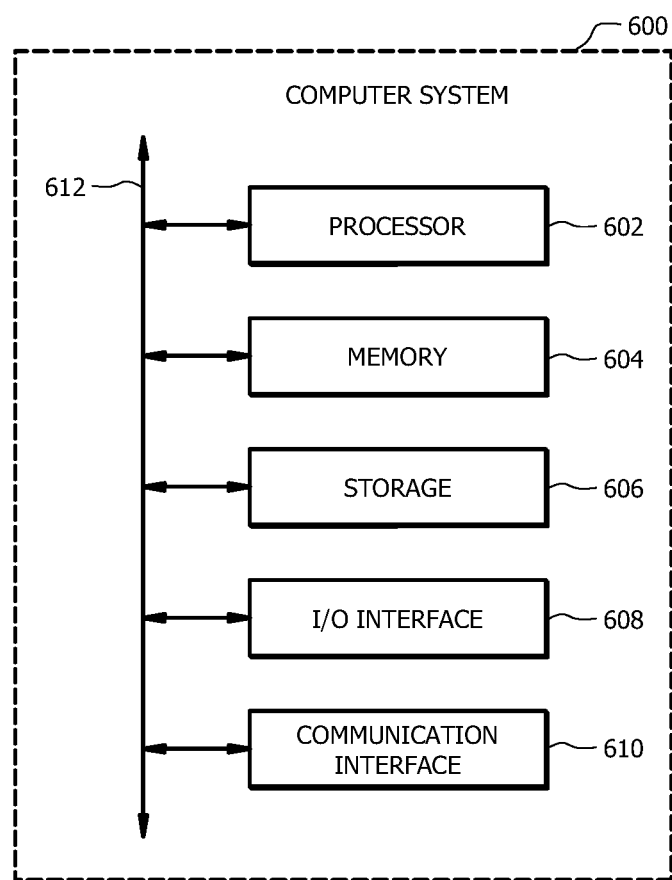
FIG. 6 illustrates an example computer that may be used to perform the image transformations of FIGS. 1-5.

Additional details are provided below with respect to FIGS. 2A-6. FIGS. 2A-2F illustrate details of example image transformations associated with producing a reduced bandwidth transmission as detailed in FIG. 3. FIGS. 4A-4G, in conjunction with the steps listed in FIG. 5, illustrate details of example image transformations associated with recreating an original multi-resolution image from an image representation. FIG. 6 illustrates an example computer system as an example of a computer 101 and computer 111 that capable of performing the image transformations to achieve the bandwidth reduction and subsequent reproduction of multi-resolution images.

Figures 2A, 2B:
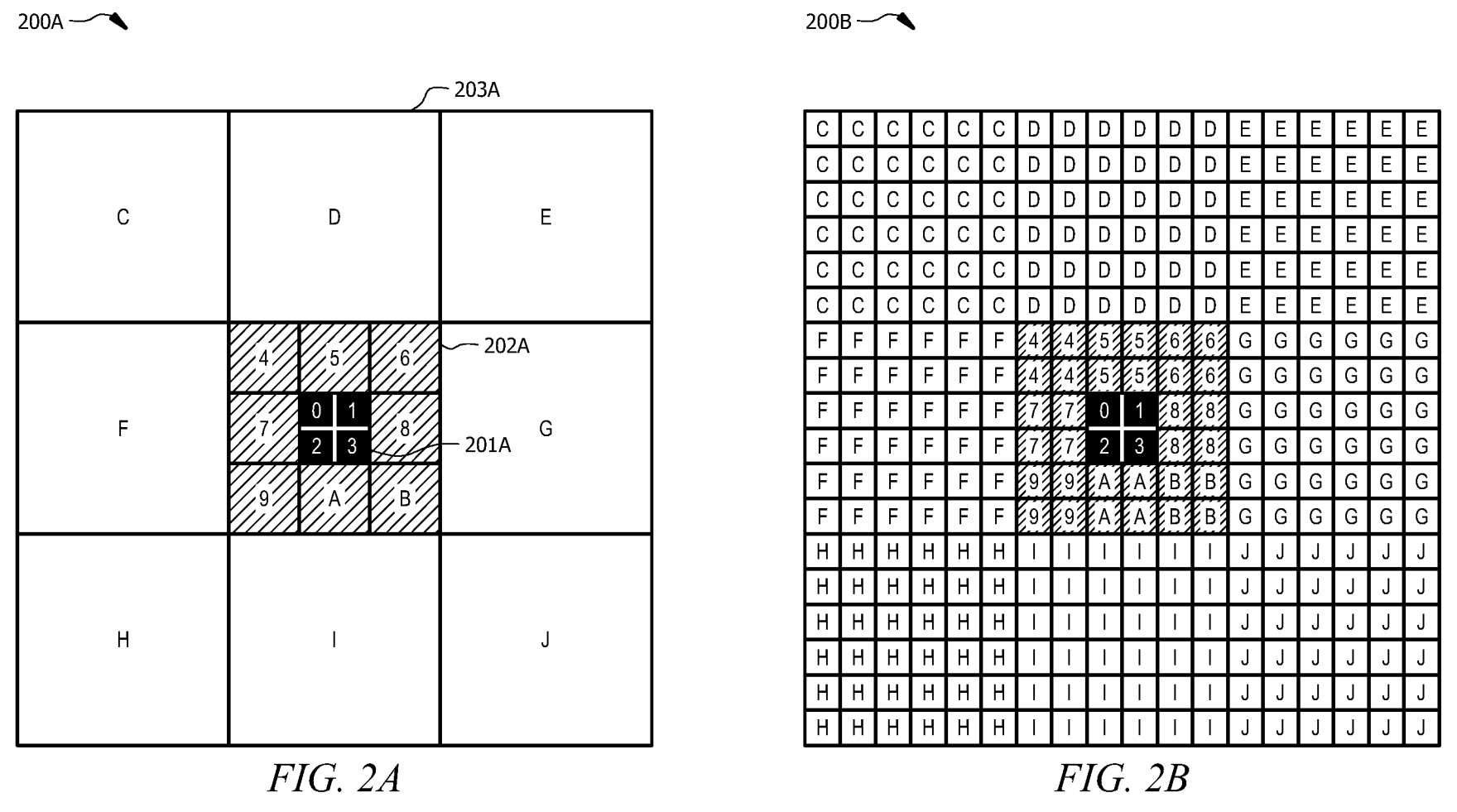
Figure 2D:
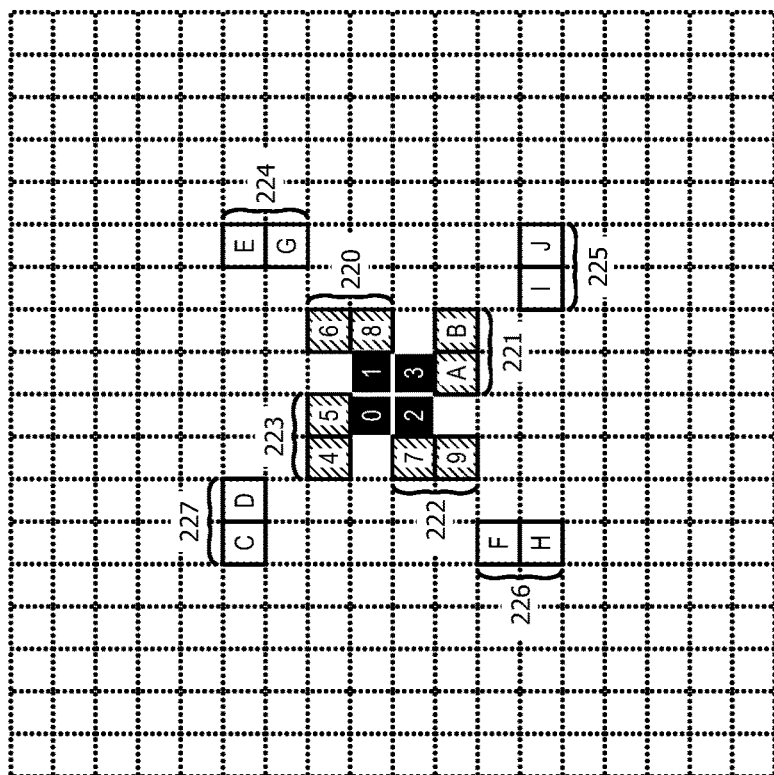

FIGS. 2A-2F illustrate an example series of image transformations for the reduced-bandwidth transmission of a multi-resolution image. FIG. 2A illustrates an example multi-resolution image 200A as may be received by system 100. Although the multi-resolution image 200A as illustrated in FIG. 2A has three regions, each with a different level of resolution, the disclosed system may function for a multi-resolution image with any number of levels of resolution. As illustrated, the multi-resolution image 200A has concentric greater levels of resolution with a common center around the center of the image with a region 201A having the greatest level of resolution as represented by the cells containing "0", "1", "2", and "3" are shaded in black. As described herein, concentric is used to mean that the various regions share a common center, rather than indicating that the regions are circular or arc shaped. The concentric regions may be rectangular in shape, shaped like a square, or may be a polygon of any shape sharing a common center with each concentric region completely surrounding the concentric region immediately interior. The next level of resolution is represented by a second region 202A containing cells "4", "5", "6", "7", "8", "9", "A", and "B" are indicated by the hatching shading. The third level of resolution, having the lowest resolution, is region 203A represented by the unshaded cells containing "C", "D", "E", "F", "G", "H", "I", and "J".

FIG. 2F, the last figure in this series, illustrates an example representative image 200F corresponding to the image information in multi-resolution image 200A. representative image 200F may be transmitted for the purposes of sending a lossless representation of the multi-resolution image 200A with reduced bandwidth using conventional display communication protocols (e.g., HDMI, DisplayPort, etc.). Intermediate images as illustrated in FIGS. 2B-2E may be unnecessary and are illustrated simply for purposes of understanding the disclosed system.

Figure 2C:
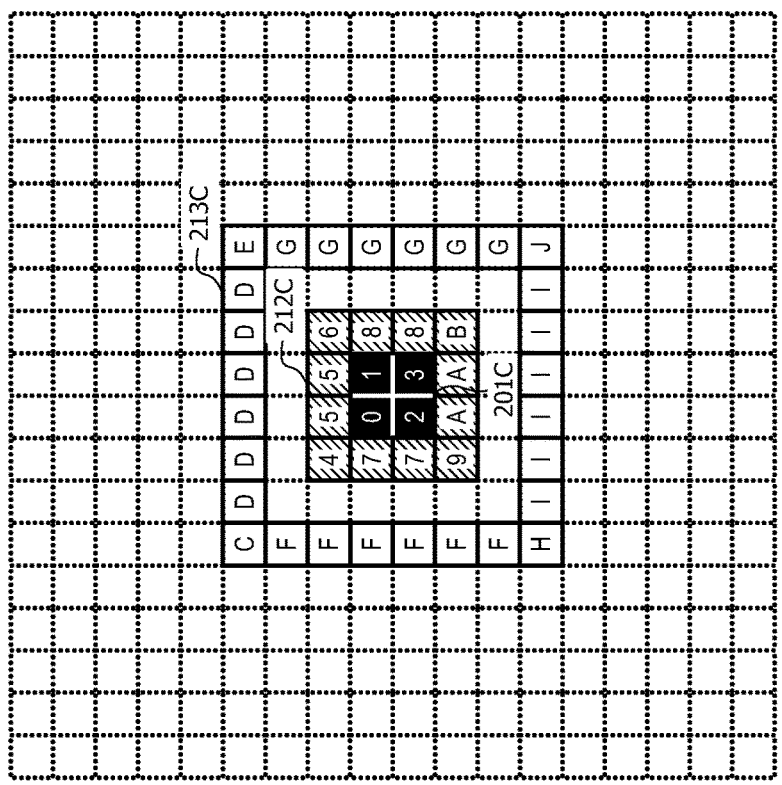
Figure 3:
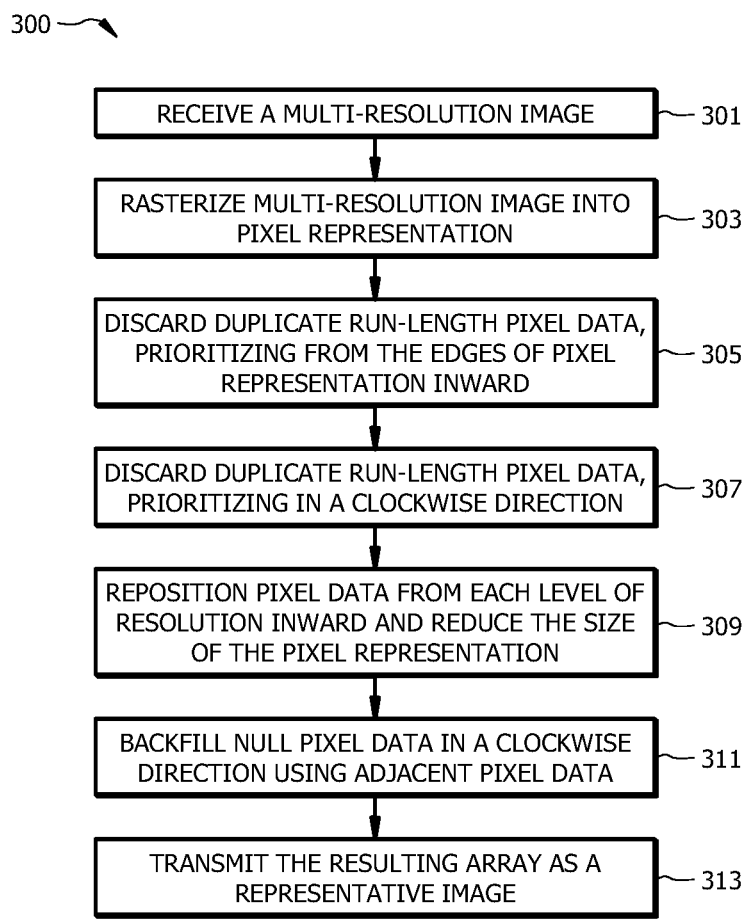
FIG. 3 is a flow chart illustrating a method of sending a reduced-bandwidth transmission of a multi-resolution image associated with the example series of image transformations of FIGS. 2A-2F.

FIGS. 2A-2F are best understood in the context of the disclosure of FIG. 3. Therefore, FIG. 3 will be described jointly with respect to corresponding FIGS. 2A-2E. FIG. 3 illustrates a method 300 comprising a series of steps 301-313. In certain embodiments, computer 101 or computer 111 may perform all of the steps of method 300. For simplicity, either computer 101 or computer 111 may be referred to as computer 101 for the following steps. In step 301, computer 101 may receive a multi-resolution image, such as the one illustrated by FIG. 2A.

In step 303 computer 101 may convert the multi-resolution image from FIG. 2A into pixel data including a complete array of pixel values as illustrated in FIG. 2B. The conversion performed in step 303 may be a conventional operation such as rasterization whereby a graphic is converted into a raster image composed of pixels. After performing step 303, the raster image 200B may be an accurate representation of the multi-resolution image 200A. As illustrated in FIG. 2B, raster image 200B is composed of three hundred and twenty-four pixels in an eighteen by eighteen array in this example, but arrays of other sizes are also contemplated. In FIG. 2B, the various levels of resolutions and the regions they make up are indicated using the same shading as described with respect to the source multi-resolution image illustrated in FIG. 2A. As a result of the rasterization process the regions are composed of many individual pixels and the pixels are of equal size between regions and throughout the image.

In step 305 computer 101 may discard duplicate run length pixel data, prioritizing pixels from the edge of the pixel representation inwards. FIG. 2C illustrates an example result of step 305 for the raster image illustrated in FIG. 2B. A number of concentric rings 201C, 212C, and 213C are formed as a result of the discarding of pixels in step 305. Each region results in a ring of pixels after step 305. Although the pixel data represented in FIG. 2C has thus been reduced to a minimum outsize dimension of eight-by-eight, it may be appreciated that for multi-resolution images having even greater numbers of levels of resolution this reduction, while significant, may not be as complete as desirable. Therefore, in step 307, pixel data from FIG. 2C may be further processed by discarding duplicate run-length pixel data in each ring, prioritizing in a first circular direction along each ring with respect to the common center of the levels of resolution at the center of the image. As illustrated in FIG. 2D, a number of ring fragments 220-227 will be produced as a result of discarding pixels from the rings in step 307. In certain embodiments, the first circular orientation may be in a clockwise direction with respect to the common center of the concentric regions. In other embodiments the first circular orientation may be in a counterclockwise direction with respect to the common center of the concentric regions.

In step 309 computer 101 may reposition pixel fragments 220-227 inward towards the concentric center of the pixel data. Repositioning of the pixel fragments 220-227 may cause each group of pixel fragments from each respective ring to be spaced away from the concentric center according to the region each pixel fragment is associated with. For example, as illustrated in FIG. 2E, the pixels from the highest level of resolution remain positioned in the very center, pixel fragments 220-223, which correspond to the region of the next highest level of resolution, are immediately surrounding the pixels from the first region, and pixel fragments 224-227, which correspond to the region of the next highest level of resolution, are immediately surrounding the pixels from the second region. In embodiments having greater numbers of regions this would continue such that each pixel fragment would abut the pixel fragment of each more interior ring. The array may also be resized in step 309. As illustrated in FIG. 2E, the array is resized from an eighteen-by-eighteen array to a six-by-six array, preserving the thirty-six pixels in the six-by-six grid around the center.

In step 311 computer 101 may backfill previously discarded pixels using pixel values from the condensed pixels 200E that were preserved so that no pixel in the array has an empty or null value. Pixels may be backfilled from preserved pixels in a second circular orientation of the respective level of resolution. For example, the second circular orientation may be the opposite direction of the first circular orientation in step 307. In certain embodiments, this second circular orientation may be in a counterclockwise direction with respect to the common center of the concentric regions. In other embodiments this second circular orientation may be in a clockwise direction with respect to the common center of the concentric regions.

After the backfill operation in step 311 a representative image 200F as illustrated in FIG. 2F may be produced. As described earlier, representative image 200F includes sufficient visual information such that the raster image 200B or the original multi-resolution image 200A may be reconstituted after transmission. After preparing the representative image 200F, in step 313 computer 101 may transmit the representative image 200F. As described with reference to FIG. 1, in certain embodiments the described transmission may be accomplished via communication link 121.

The method described with respect to FIG. 3 may have more or fewer steps, and the steps may be performed in any suitable order (e.g., steps 303-311 may performed as a single step or certain steps may proceed others). As an example, steps 311-313 may be optional in certain embodiments or may performed in a single step in certain embodiments.

As previously stated, the disclosed technique may be accomplished with images with any number of levels of resolution. For the example image illustrated in FIGS. 2A-2F multi-resolution image 200A is composed of twenty quanta. As understood in the art, a quanta may represent a single pixel or a cluster of identical high-resolution pixels.

Traditional data transmission mechanisms would require 324 pixels of data for an image as illustrated by image 200B. Using the above disclosed technique to generate a representative image 200F, the complete information of multi-resolution image 200A may be conveyed using only 36 pixels, a significant reduction in the bandwidth required to transmit multi-resolution images.

The bandwidth-reduction benefits of the disclosure may be even greater for foveated images with increasing number of levels of resolution. For example, the bandwidth of a thirty-six quanta two-level-resolution image transmission may be reduced by ~55% to a sixteen quanta lossless transmission, the bandwidth of a three-hundred twenty-four quanta three-level-resolution image transmission may be reduced by ~89% to a thirty-six quanta lossless transmission, the bandwidth of a two-thousand sixteen quanta four-level-resolution image may be reduced by ~98% to a sixty-four quanta lossless transmission, and so forth.

Figures 4A, 4B:
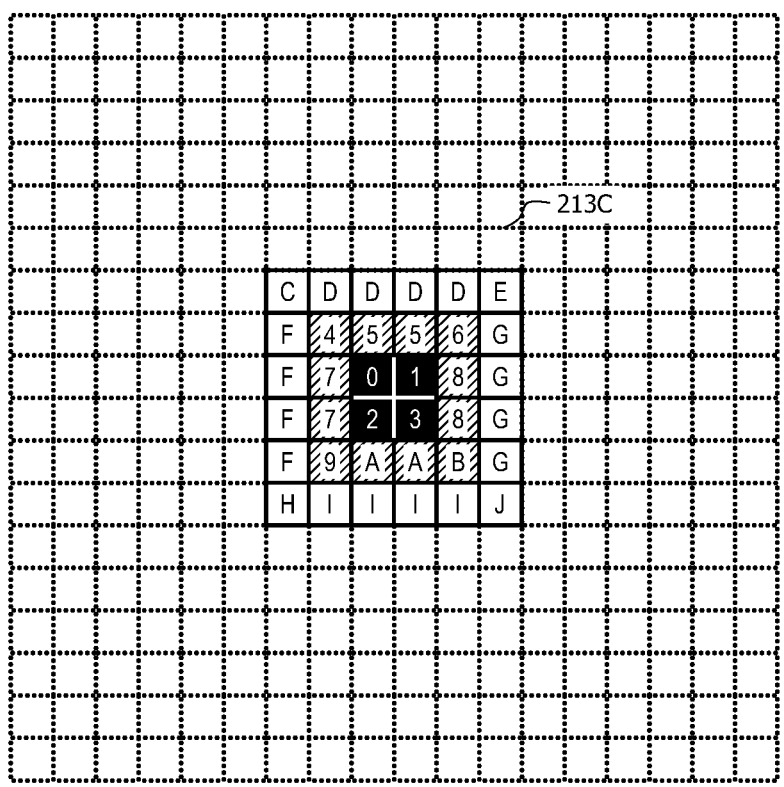

FIGS. 4A-4F illustrates an example series of image transformations for the reconstitution of a multi-resolution image from a received representative image. Intermediate images as illustrated in FIGS. 4B-4E may be unnecessary and are illustrated simply for purposes of understanding the disclosed system. FIG. 4A illustrates a representative image 400A. For consistency, representative image 400A is analogous to representative image 200F. In some embodiments, the representative image 400A may be received as representative image 200F. FIG. 4E illustrates a reconstituted multi-resolution image 400E. In certain embodiments, reconstituted image 400E may be used to display a foveated image.

FIGS. 4A-4F are best understood in the context of the disclosure of FIG. 3. Therefore, FIG. 5 will be described jointly with respect to corresponding FIGS. 4A-4E. FIG. 5 illustrates a method 500 comprising a series of steps 501-513. In certain embodiments, computer 101 or 111 may perform all of the steps of method 500. For simplicity, either computer 101 or computer 111 may be referred to as computer 101 for the following steps. In step 501, computer 101 may receive a representative image, such as the one illustrated by FIG. 4A.

In step 503 computer 101 may determine a length, width, and scale factor based on a length and width of the received representative image. In embodiments where the representative image has a one-to-one aspect ratio only the length or the width may need to be determined since the array will have equal length and width. For example, in certain embodiments, the scale factor may be determined as three times the sum of the factorial of the length from 0.0 to 0.5 the length of representative image. In certain other embodiments the scale factor may be determined as three times the length of representative image. The scale factor may be any factor and may be known as a precondition of the operation of method 500.

In step 505 computer 101 may resize the array based on the determined length and width from step 503 as illustrated in FIG. 4B. In step 507 each layer of resolution may be expanded in the resized array according to the scale factor determined in step 503. The resulting image from the repositioning of pixel fragments 424-427 according to the determine scale factor is illustrated as 400C in FIG. 4C.

Figure 4D:
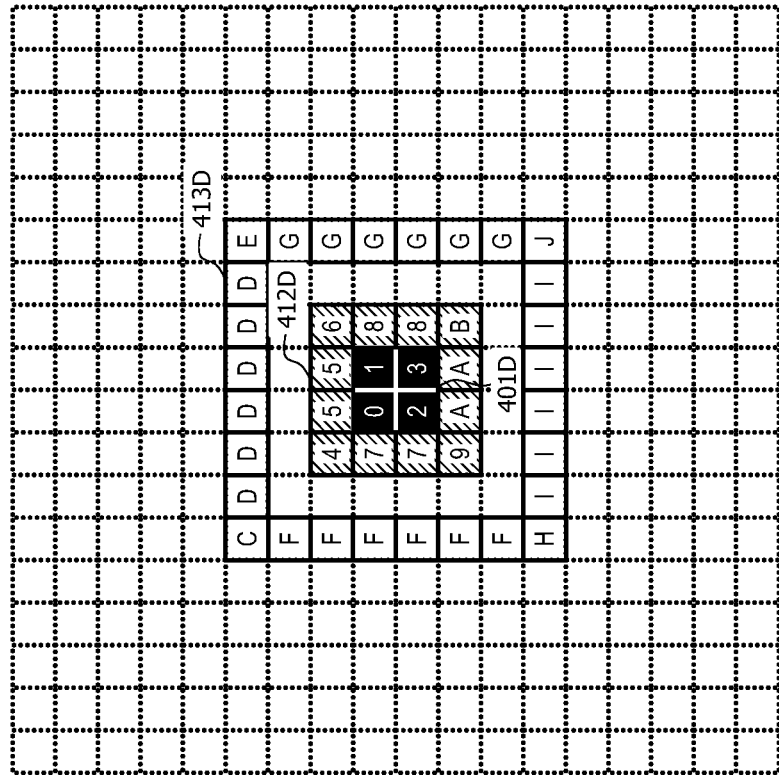
Figure 4C:
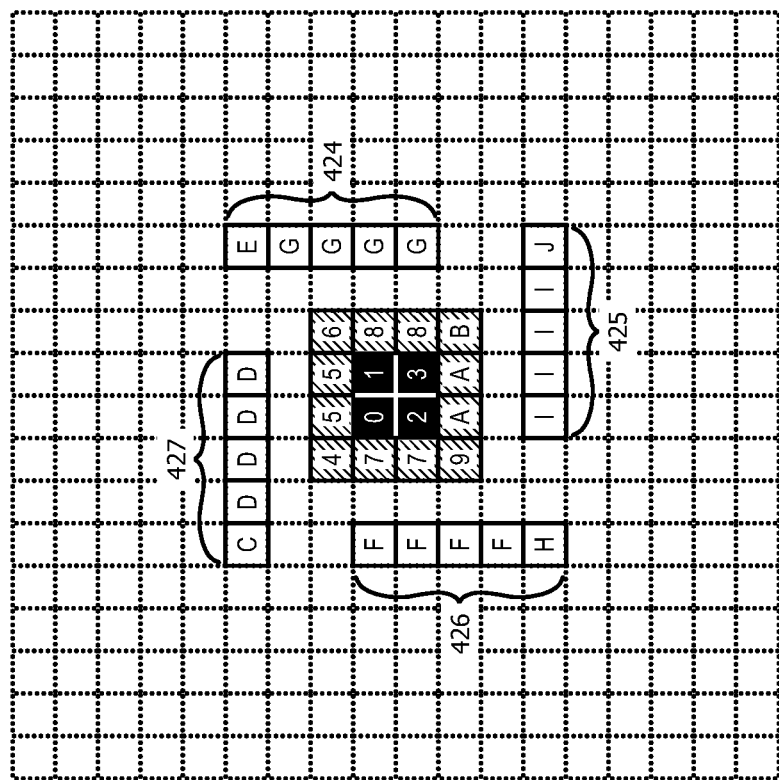
Figures 4E, 4F:
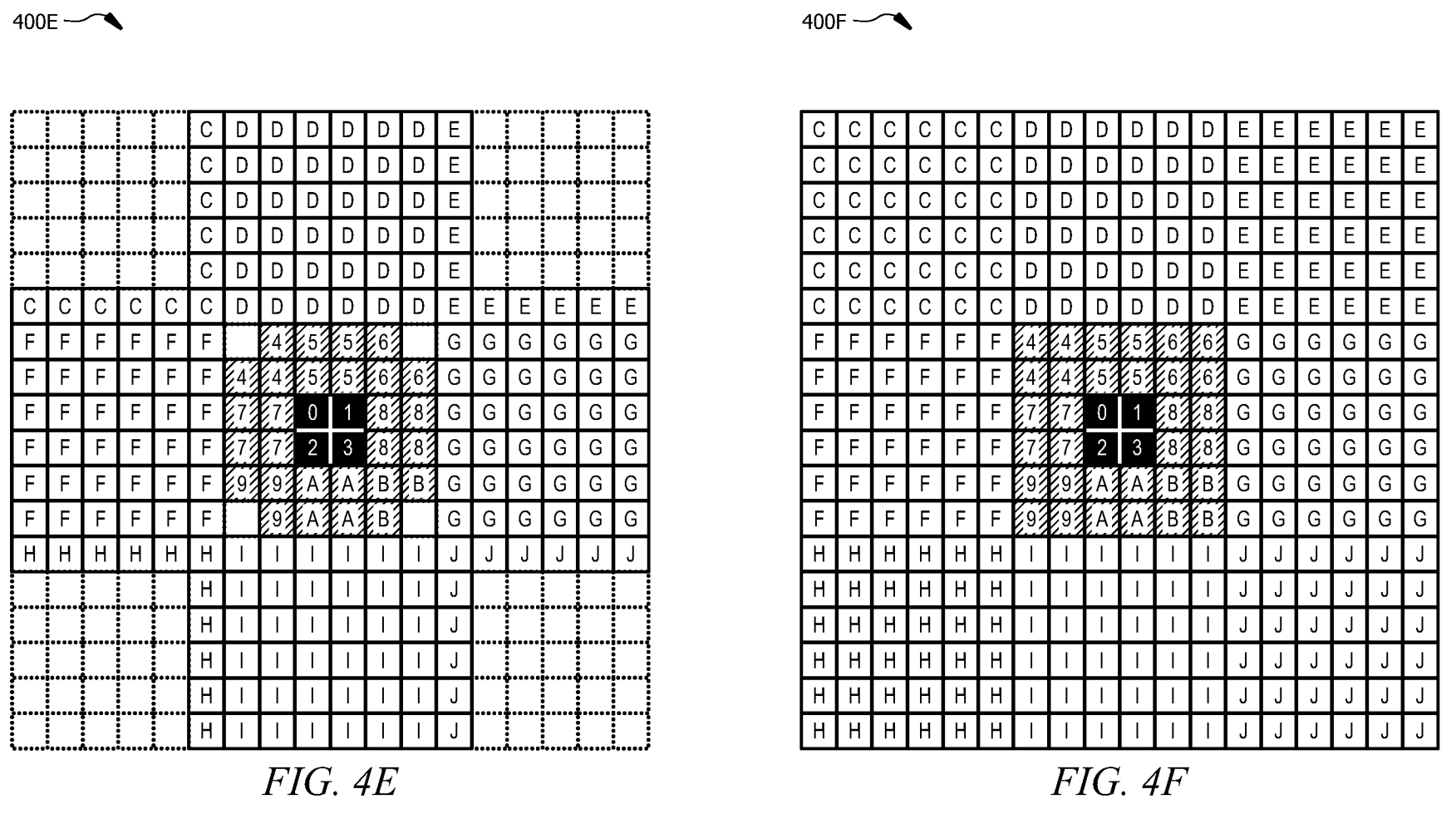

After repositioning pixel fragments 424-427 in step 507, in step 509 missing pixels may be replaced to form a plurality of rings within each region. The pixel values may be selected from the nearest pixel within each ring in a first circular orientation about the concentric center. In certain embodiments, the first circular orientation may be in a clockwise direction with respect to the common center of the concentric regions. In other embodiments the first circular orientation may be in a counterclockwise direction with respect to the common center of the concentric regions. FIG. 4D illustrates an image 400D having three concentric rings 401D, 412D, and 413D corresponding to each region as a result of replacing pixel values in step 509.

In step 511 computer 101 may fill in missing pixels for each region using the values of the pixels of each ring at the interior of each region. The pixel value at the interior of the region may be applied as the pixel value of each pixel in an outward direction from the concentric center of the array as illustrated by intermediate image 400E of FIG. 4E. In step 515, the corners of each region may be filled in with pixel values selected from the nearest pixel within each region in a second circular orientation about the concentric center. The second circular orientation may be in the same direction or in the reverse direction of the first circular orientation (i.e., either clockwise or counterclockwise). As illustrated in FIG. 4F, the generated array 400F represents a reconstituted multi-resolution image based on the representative image 400A.

Figure 4G:
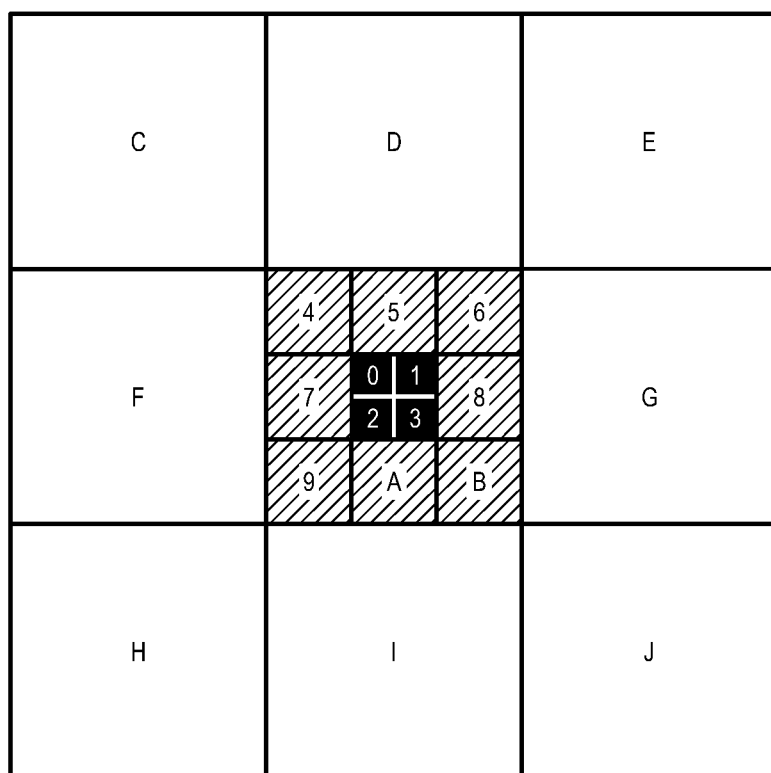

In some embodiments, computer 101 may also convert reconstituted multi-resolution image from raster form 400F into original form 400G as illustrated in FIG. 4G. Computer 101 may also transmit the reconstituted image 400E as in optional step 515.

The method described with respect to FIG. 5 may have more or fewer steps, and the steps may be performed in any suitable order (e.g., steps 503-511 may performed as a single step or certain steps may proceed others). As an example, steps 511-513 may be optional in certain embodiments or may performed in a single step in certain embodiments.

FIG. 6 illustrates an example computer system 600. Computer system 600 may represent computer 101 and computer 111 and perform one or more of the methods described with respect to FIGS. 2A-5. Software may be provided on a non-transitory computer readable medium illustrated as memory 604 or storage 606. Software running on one or more computer systems 600 may perform one or more steps of one or more methods described or illustrated herein or provides functionality described or illustrated herein. Particular embodiments include one or more portions of one or more computer systems 600. Herein, reference to a computer system may encompass a computing device, and vice versa, where appropriate.

This disclosure contemplates any suitable number of computer systems 600. This disclosure contemplates a computer system 600 taking any suitable physical form. As example and not by way of limitation, computer system 600 may be an embedded computer system, a system-on-chip ("SOC"), a single-board computer system ("SBC") (such as, for example, a computer-on-module ("COM") or system-on-module ("SOM")), a desktop computer system, a laptop or notebook computer system, an interactive kiosk, a mainframe, a mesh of computer systems, a mobile telephone, a personal digital assistant ("PDA"), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

Computer system 600 includes a processor 602, memory 604, storage 606, an input/output ("I/O") interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

Processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. Processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers ("TLBs"). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. Processor 602 may include one or more internal registers for data, instructions, or addresses. This disclosure contemplates processor 602 including any suitable number of any suitable internal registers, where appropriate. Where appropriate, processor 602 may include one or more arithmetic logic units ("ALUs"); be a multi-core processor; or include one or more processors 602. Although this disclosure describes and illustrates a particular processor, this disclosure contemplates any suitable processor.

Memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. Processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. One or more memory management units ("MMUs") reside between processor 602 and memory 604 and facilitate accesses to memory 604 requested by processor 602. Memory 604 includes random access memory ("RAM"). This RAM may be volatile memory, where appropriate. Where appropriate, this RAM may be dynamic RAM ("DRAM") or static RAM ("SRAM"). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

Storage 606 includes mass storage for data or instructions. As an example and not by way of limitation, storage 606 may include a hard disk drive ("HDD"), a floppy disk drive, flash memory, an optical disc, a magneto-optical disc, magnetic tape, or a USB drive or a combination of two or more of these. Storage 606 may include removable or non-removable (or fixed) media, where appropriate. Storage 606 may be internal or external to computer system 600, where appropriate. Storage 606 is non-volatile, solid-state memory. Storage 606 includes read-only memory ("ROM"). Where appropriate, this ROM may be mask-programmed ROM, programmable ROM ("PROM"), erasable PROM ("EPROM"), electrically erasable PROM ("EEPROM"), electrically alterable ROM ("EPROM"), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

Communication interface 610 includes hardware, software, or both providing one or more interfaces for communication (such as, for example, packet-based communication) between computer system 600 and one or more other computer systems 600 or one or more networks 121-123. As an example and not by way of limitation, communication interface 610 may include a network interface controller ("NIC") or network adapter for communicating with an Ethernet or other wire-based network or a wireless NIC ("WNIC") or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, computer system 600 may communicate with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

Bus 612 includes hardware, software, or both coupling components of computer system 600 to each other. As an example and not by way of limitation, bus 612 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits ("ICs") (such, as for example, field-programmable gate arrays ("FPGAs") or application-specific ICs ("ASICs")), hard disk drives ("HDDs"), hybrid hard drives ("HHDs"), optical discs, optical disc drives ("ODDs"), magneto-optical discs, magneto-optical drives, floppy diskettes, floppy disk drives ("FDDs"), magnetic tapes, solid-state drives ("SSDs"), RAM-drives, SECURE DIGITAL cards or drives, any other suitable computer-readable non-transitory storage media, or any suitable combination of two or more of these, where appropriate. For example, computer system 600 may be a decoder chip and/or encoder chip (e.g., ASIC) within source 102 and/or destination 112. A computer-readable non-transitory storage medium may be volatile, non-volatile, or a combination of volatile and non-volatile, where appropriate.

Modifications, additions, or omissions may be made to any of the methods disclosed herein. These methods may include more, fewer, or other steps, and steps may be performed in parallel or in any suitable order. Certain examples have been described using the modifiers "first" or "second" or "third" (e.g., first computer, second computer; first circular orientation, second circular orientation; first level of resolution, second level of resolution, third level of resolution). Unless the context in which these modifiers appear indicates otherwise, the modifiers do not require any particular sequence of steps or arrangement of devices.

Herein, the term "polygonal" means any shape bounded by three or more straight sides (e.g., triangular, rectangular, hexagonal). Herein, the terms "first circular orientation" and "second circular orientation" refer to either a clockwise direction or a counterclockwise direction with respect to the common center of the concentric regions unless expressly indicated otherwise. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A non-transitory computer readable medium comprising logic that, when executed by a processor, causes the processor to perform operations for reconstituting a multi-resolution image from a representative image comprising:
   receiving a representative image comprising an array of pixels, the representative image having a plurality of concentric regions, each concentric region corresponding to a different level or resolution from a source image, wherein the concentric regions closer to a center of the multi-resolution correspond to regions with the higher resolution;
   generating a reconstituted multi-resolution image by:
      determining a length and a width for a resized array based on a length and a width of the array of pixels of the received representative image;
      determining a scale factor based on the length and the width of the array of pixels of the received representative image;
      resizing the array of pixels, wherein the dimension of the resized array of pixels is based at least in part on the determined length and width for the resized array;
      repositioning pixel fragments from each region away from the center, wherein the repositioning of each pixel fragment is based at least in part on the scale factor;
      replacing missing pixels with a pixel value, the pixel value selected from a pixel in a nearest first circular orientation of the respective level or resolution, such that replacing missing pixels defines a plurality of rings; and
      replacing exterior pixels from each concentric region with a pixel value, the pixel value of the exterior pixels being selected from a pixel value in an interior position from the ring corresponding to the region.

2. The non-transitory computer readable medium of claim 1, wherein the non-transitory computer readable medium further comprises logic configured to cause the reconstituted multi-resolution image to be transmitted.

3. The non-transitory computer readable medium of claim 1, wherein the received multi-resolution image is a foveated image having a fixation point.

4. The non-transitory computer readable medium of claim 1, wherein each of the regions have a thickness of a single pixel.

5. The non-transitory computer readable medium of claim 1, wherein the representative image has a one-to-one aspect ratio.

6. The non-transitory computer readable medium of claim 1, wherein the representative image has at least two levels of resolution.

7. A method for reconstituting a multi-resolution image from a representative image, the method comprising:
   receiving a representative image comprising an array of pixels, the representative image having a plurality of concentric regions, each concentric region corresponding to a different level or resolution from a source image, wherein the concentric regions closer to a center of the multi-resolution correspond to regions with the higher resolution; and
   generating a reconstituted multi-resolution image by:
      determining a length and a width for a resized array based on a length and a width of the array of pixels of the received representative image;
      determining a scale factor based on the length and the width of the array of pixels of the received representative image;
      resizing the array of pixels, wherein the dimension of the resized array of pixels is based at least in part on the determined length and width for the resized array;
      repositioning pixel fragments from each region away from the center, wherein the repositioning of each pixel fragment is based at least in part on the scale factor;
      replacing missing pixels with a pixel value, the pixel value selected from a pixel in a nearest first circular orientation of the respective level or resolution, such that replacing missing pixels defines a plurality of rings; and
      replacing exterior pixels from each concentric region with a pixel value, the pixel value of the exterior pixels being selected from a pixel value in an interior position from the ring corresponding to the region.

8. The method of claim 7, wherein the received multi-resolution image is a foveated image having a fixation point.

9. The method of claim 7, wherein each of the regions have a thickness of a single pixel.

10. The method of claim 7, wherein the representative image has a one-to-one aspect ratio.

11. The method of claim 7, wherein the representative image has at least two levels of resolution.

12. A system comprising:
   one or more processors; and
   one or more computer-readable non-transitory storage media coupled to one or more of the processors and comprising instructions operable when executed by one or more of the processors to cause the system to:
      receive a representative image comprising an array of pixels, the representative image having a plurality of concentric regions, each concentric region corresponding to a different level or resolution from a source image, wherein the concentric regions closer to a center of the multi-resolution correspond to regions with the higher resolution; and
      generate a reconstituted multi-resolution image by:
         determining a length and a width for a resized array based on a length and a width of the array of pixels of the received representative image;
         determining a scale factor based on the length and the width of the array of pixels of the received representative image;

resizing the array of pixels, wherein the dimension of the resized array of pixels is based at least in part on the determined length and width for the resized array;

repositioning pixel fragments from each region away from the center, wherein the repositioning of each pixel fragment is based at least in part on the scale factor;

replacing missing pixels with a pixel value, the pixel value selected from a pixel in a nearest first circular orientation of the respective level or resolution, such that replacing missing pixels defines a plurality of rings; and replacing exterior pixels from each concentric region with a pixel value, the pixel value of the exterior pixels being selected from a pixel value in an interior position from the ring corresponding to the region.

13. The system of claim 12, wherein the received multi-resolution image is a foveated image having a fixation point.

14. The system of claim 12, wherein each of the regions have a thickness of a single pixel.

15. The system of claim 12, wherein the representative image has a one-to-one aspect ratio.

16. The non-transitory computer readable medium of claim 7, wherein the representative image has at least two levels of resolution.

* * * * *